United States Patent [19]

Takeuchi et al.

[11] Patent Number: 4,611,317

[45] Date of Patent: Sep. 9, 1986

[54] OPTICAL DISK APPARATUS

[75] Inventors: Toyoaki Takeuchi; Ken Ohshima; Hideyuki Kenjyo; Yoshiaki Ikeda; Masaharu Sakamoto, all of Tokyo, Japan

[73] Assignee: Olympus Optical Co., Ltd., Tokyo, Japan

[21] Appl. No.: 561,653

[22] Filed: Dec. 15, 1983

[30] Foreign Application Priority Data

Dec. 23, 1982 [JP] Japan .................. 57-232033

[51] Int. Cl.[4] .................................... G11B 7/00
[52] U.S. Cl. ...................... 369/45; 369/50; 369/58
[58] Field of Search ............... 369/44, 45, 46, 47, 369/48, 50, 51, 54, 58, 106, 111; 358/342

[56] References Cited

U.S. PATENT DOCUMENTS

| 4,475,182 | 10/1984 | Hosaka | 369/45 |
| 4,494,154 | 1/1985 | Akiyama | 369/46 |
| 4,497,047 | 1/1985 | Fujiie et al. | 369/45 |

Primary Examiner—Donald McElheny, Jr.
Attorney, Agent, or Firm—Frishauf, Holtz, Goodman & Woodward

[57] ABSTRACT

An optical disk apparatus has an optical disk for recording data into a recording area on an optical disk and reproducing the recorded data from the recording area. The optical disk is provided at the center with a first section with the same reflectivity as that of the recording area and a second section with a different reflectivity from that of the recording area. A photosensor sense detects the first section and produces a signal representing a reflectivity on the first section. The reflectivity data obtained from the signal level is used for controlling a gain of the servo system according to the reflectivity data.

6 Claims, 3 Drawing Figures

OPTICAL DISK APPARATUS

BACKGROUND OF THE INVENTION

This invention relates to an optical disk apparatus for optically recording and receiving data to and from an optical disk.

When the optical disk apparatus records or reproduces data, it requires a reference signal to ensure synchronization of a recording signal and a reproducing signal. To obtain a reference signal, an index mark is put on a non-recording area of an optical disk. This mark is detected by a photosensor while the disk is rotating. Every time the disk rotates once, the photosensor generates one or more signals. Reflective material is vapor-deposited on the recording area of the optical disk. A spiral recording track is formed on the vapor-deposited layer, and data is optically recorded in this track. The data may be optically reproduced from the disk. When the reflectivity of the layer changes, the level of a signal reproduced from the disk changes, and so does the peak value of an error signal, e.g., a tracking error signal. The change in the peak value of the error signal results in the change in the level of an output of a servo system which contains focussing and tracking servo controls. If the level of the output of the system varies, the system fails to operate stably. An amplifier which has a gain large enough to stabilize the servo system is used. However, when the reflectivity of the reflective layer is too large to produce a high level signal is too high. An excessive gain creates various problems hindering the stable operation of the servo system. Another problem is inherent in this type of an optical disk apparatus. Binary data is recorded on the track in the form of a series of pits. A laser light reflected from this track is thus diffracted. Due to the diffraction, part of the reflected light fails to reach an objective lens. The amount of light which the objective lens receives is therefore reduced. This reduction of light varies in accordance with the depths of the pits. Consequently, the data representing the reflectivity of the layer cannot be accurately obtained from the optical signals which are read from the disk and which correspond to the binary data recorded on the recording area of the disk.

SUMMARY OF THE INVENTION

Accordingly, an object of the present invention is to provide an optical disk apparatus which exactly detects a reflectivity of the optical disk and controls a gain of the servo system according to the detected reflectivity, thereby to stabilize the servo system.

In an optical disk apparatus according to the present invention, a non-recording area on the optical disk is provided with a first section made of reflective material with the same reflectivity as that of the recording area and a second section made of material with a different reflectivity from that of the recording area. The first and second sections cooperatively form the index mark. The index mark is detected by the photosensor. The output signal of the sensor is used for forming an index signal and a sampling signal. The sampling signal is used for detecting a reflectivity of the first section. The reflectivity is computed using a level of the sampling signal. The gain of the servo system is controlled according to the computed reflectivity.

DETAILED DESCRIPTION OF THE PREFERRED EMBODIMENT

Figure 1:
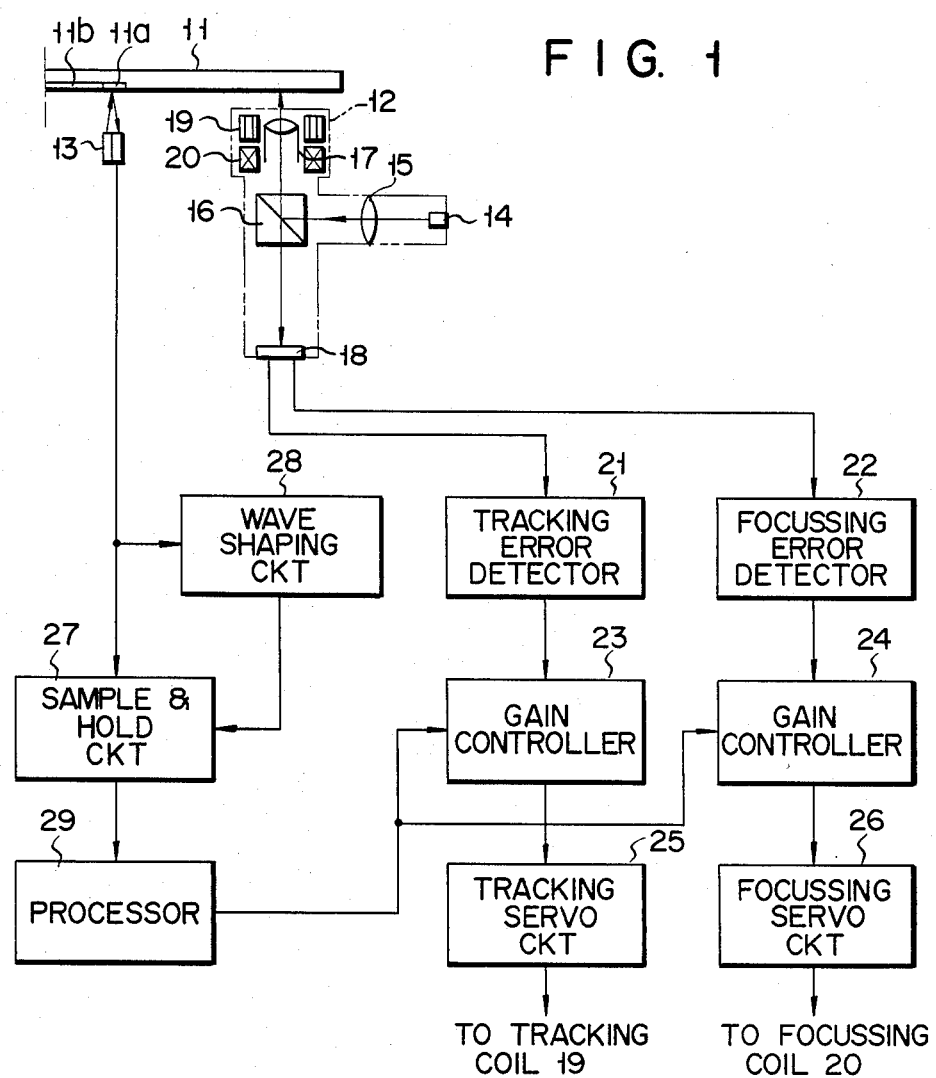
FIG. 1 is a block diagram of an embodiment of an optical disk apparatus according to the present invention.
Figure 2:
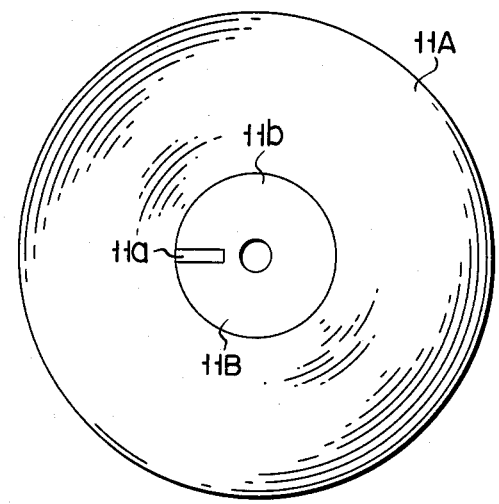
FIG. 2 illustrates a plan view of an optical disk.

Reference is made to FIG. 1 illustrating an optical disk apparatus according to the present invention. As shown, an optical head 12 and a photosensor 13 are disposed facing an optical disk 11. The optical disk 11 contains a recording area 11A occupying a large peripheral part on the surface of the disk and a non-recording area 11B located at the center surrounded by the recording area 11A. The recording area 11A is vapor-deposited with reflective material to have a reflective layer. The non-recording area 11B contains a first section (or sections) 11a with the same reflectivity as that of the recording area 11A and a second section 11b with a different reflectivity from that of the recording area 11A.

The optical head 12 is comprised of a semiconductor laser 14, a collimator lens 15, a beam splitter 16, an objective lens system 17 and a photosensor 18. A tracking coil 19 and a focussing coil 20 are disposed close to the objective lens system 17. The photosensor 18 has a tracking error detecting sensor and a focussing error detecting sensor. Those sensors are connected to a tracking error detector 21 and a focussing error detector 22. The output terminals of these detectors 21 and 22 are connected to first control terminals of gain controllers 23 and 24, respectively. The output terminal of the tracking servo control circuit 25 is connected to the tracking coil 19. The focussing servo circuit 26 is connected to the focussing coil 20.

The output terminal of a photosensor 13 is connected to a sample/hold circuit 27 and a wave shaping circuit 28. The output terminal of the wave shaping circuit 28 is connected to a system controller (not shown) for synchronizing the optical disk with the optical head, and to the sample/hold circuit 27. The sample/hold circuit 27 is arranged so as to hold an output signal of the photosensor 13 in synchronism with the output signal of the wave shaping circuit 28. The output terminal of the sample/hold circuit 27 is connected to a processor 29. The processor 29 is so designed as to compute a reflectivity of the optical disk 11 using a hold signal of the sample/hold circuit 7. The output terminal of the processor 29 is connected to the second terminals of the gain controllers 23 and 24.

In operation, when the optical disk 11 rotates, the photosensor 13 senses a reflectivity on the reflective section, i.e. the first section 11a, in the non-recording area 11B on the optical disk 11, and produces a signal representing the sensed reflectivity on the first section 11a for each rotation of the optical disk 11. In the optical head 12, the semiconductor laser 14 emits a laser beam, and the emitted laser beam is collimated by the collimator lens 15. The collimated laser beam enters the beam splitter 16. The beam splitter 16 directs the laser beam to the optical disk 11 through the objective lens system 17. The reflected laser beam from the optical disk 11 enters the photosensor 18 through the objective lens system 17 and the beam splitter 16. The photosensor 18 produces a tracking signal and a focussing signal, which are then applied to the tracking error detector 21 and the focussing error detector 22, respectively. The detectors 21 and 22 detect respectively tracking and focussing errors. For the tracking error detection, a push-pull method, for example, is used. In this method, two signals derived from photosensors, segmented symmetrically with respect to an optical axis, are used for detecting a tracking error. More exactly, when the laser light is uniformly incident on both the segments of the photosensor, the tracking is correct. If the uniformity of the laser light irradiation on those segments is lost, the tracking operation goes wrong to cause a tracking error. The tracking error caused is detected by a level difference between the output signals from the two segments.

Figure 3:
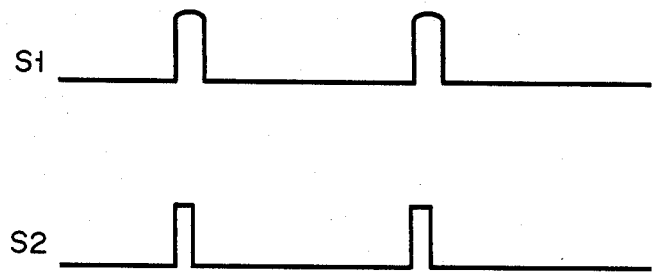
FIG. 3 is a time chart of output signals of a photosensor and a wave shaping circuit.

When the focussing coil 20 detects a tracking error, it supplies a signal showing its error to the gain controller 23. The gain controller 23 supplies a tracking servo control drive signal, which is at the level corresponding to the amount of the tracking error, to the tracking servo control circuit 25. The gain controller 23 changes the gain of an amplifier for amplifying the tracking error signal, in accordance with the reflectivity data supplied from the processor 29 which represents the reflectivity of the optical disk. Hence, the tracking servo drive signal correctly corresponds to the amount of the error even if the reflectivity of the disk changes. The reflectivity data is based on the output signal of the photosensor 13. When the photosensor 13 produces a reflectivity signal S1 (FIG. 3) representing the reflectivity of the first section 11a, this signal is held by the sample/hold circuit 27. In this case, the sample/hold circuit 27 samples and holds the signal S1 by an output pulse S2 of the wave shaping circuit 28. The signal has a voltage level representing the reflectivity of the optical disk 11. This signal is applied to the processor 29 which in turn computes the reflectivity using this input signal. The gain controller 23 applies a gain signal to the tracking servo circuit 25. Upon receipt of this signal, the tracking servo circuit 25 feeds a drive current to the tracking coil 19. The tracking coil 19 drives, on the basis of the signal received, the objective lens system 17 so as to correct the tracking error.

When the focussing error detector 22 produces a focussing error signal, the gain controller 24 also determines a gain for amplifying the focussing error, on the basis of the reflectivity data, and produces a focussing servo drive signal corresponding to the focus error. The focussing servo circuit 26 supplies to the focussing coil 20 a drive current corresponding to the focussing servo drive signal from the gain controller 24. At this time, the objective lens system 17 is driven so as to correct the focussing error by the focussing coil 20.

As describe above, the light reflected from the reflective section as the index mark on the optical disk 11 is sensed by the photosensor 13. A reflectivity of the optical disk 11 is obtained from the signal of the photosensor 13. A gain of the objective servo system containing the tracking and focussing servo controls is determined on the basis of the reflectivity data. Therefore, the servo system operation is stable.

In the above-mentioned embodiment, an abnormality of the optical head can be detected by comparing signals representing the reflectivity in the reflective section in the non-recording area and that in the recording area. A push-pull method is used to detect a tracking error. This method may be replaced by the other conventional tracking error detecting methods.

What is claimed is:

1. An optical disk apparatus comprising:
   optical disk means containing a recording area having at least one first section with the same reflectivity as that of said recording area and at least one second section with a reflectivity different from that of said recording area;
   first detecting means facing said optical disk means for optically detecting said first and second sections of said disk means to produce a reflectivity signal having a level corresponding to a reflectivity of said first section;
   optical head means facing said optical disk means for recording and reproducing data to and from said recording area;
   second detecting means for detecting tracking and focussing errors of said optical head and to generate tracking and focussing error signals;
   servo means coupled to said optical head means for controlling the tracking and focussing of said optical head means; and
   servo control means connected to said servo means and to said first detecting means for converting the reflectivity signal to a servo gain signal, said servo gain signal being coupled to said servo means for establishing the gain of said servo means at a value corresponding to the reflectivity of the recording area on said disk means.

2. An optical disk apparatus according to claim 1, wherein said first detecting means includes a light emitting means for emitting light onto said disk, and a photosensor facing said non-recording area for optically sensing detecting the light reflected from said first section of said non-recording area to produce a signal with a level corresponding to the sensed reflectivity of said first section.

3. An optical disk apparatus according to claim 1, wherein said servo means includes means having a controllably variable gain, and wherein said servo control means includes means for holding the reflectivity signal from said first detecting means and means for deriving said servo gain signal from the level of the reflectivity signal obtained from said holding means, the output of said deriving means being coupled to the input of said variable gain means to produce the reflectivity data.

4. An optical disk apparatus according to claim 1, wherein said servo control means includes means for wave-shaping the reflectivity signal obtained from said first detecting means to produce an output signal, said holding means being coupled to the wave-shaping means to hold the reflectivity signal in response to the output signal from said wave-shaping means.

5. An optical disk apparatus according to claim 1, wherein:
   said optical head means includes a semiconductor laser for emitting a laser beam and an optical system for directing the laser beam to said optical disk; and
   said servo means includes tracking and focussing means for dirving said optical system to track and focus in response to the tracking and focussing error signals and said servo gain signal.

6. An optical disk apparatus according to claim 1, wherein said optical disk means comprises an optical disk having a center portion and a peripheral portion surrounding said center portion, and said non-recording area is located at said center portion of said optical disk.

* * * * *